United States Patent
Chen et al.

(10) Patent No.: US 9,015,725 B2
(45) Date of Patent: Apr. 21, 2015

(54) SYSTEMS AND METHODS FOR DISTRIBUTING A WORKLOAD BASED ON A LOCAL COOLING EFFICIENCY INDEX DETERMINED FOR AT LEAST ONE LOCATION WITHIN A ZONE IN A DATA CENTER

(75) Inventors: Yuan Chen, Sunnyvale, CA (US); Zhikui Wang, Fremont, CA (US); Cullen E. Bash, Los Gatos, CA (US); Alan A. McReynolds, Los Altos, CA (US); Niru Kumari, Mountain View, CA (US); Chris D. Hyser, Victor, NY (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 274 days.

(21) Appl. No.: 13/563,551

(22) Filed: Jul. 31, 2012

(65) Prior Publication Data
US 2014/0040899 A1    Feb. 6, 2014

(51) Int. Cl.
*G06F 9/46*    (2006.01)
*G06F 9/50*    (2006.01)

(52) U.S. Cl.
CPC ................... *G06F 9/5094* (2013.01)

(58) Field of Classification Search
CPC ........ G06F 9/46; G06F 9/4881; G06F 9/5094
USPC ......................... 718/102, 104, 105
See application file for complete search history.

(56) References Cited

U.S. PATENT DOCUMENTS

| 7,724,149 | B2 * | 5/2010 | Kettler et al. ................. 340/584 |
| 8,214,829 | B2 | 7/2012 | Neogi et al. |
| 8,612,785 | B2 * | 12/2013 | Brown et al. .................. 713/320 |
| 2003/0193777 | A1 * | 10/2003 | Friedrich et al. .............. 361/687 |
| 2005/0278070 | A1 * | 12/2005 | Bash et al. ..................... 700/276 |
| 2006/0047808 | A1 * | 3/2006 | Sharma et al. ................. 709/224 |
| 2006/0259621 | A1 * | 11/2006 | Ranganathan et al. ........ 709/226 |
| 2008/0288193 | A1 * | 11/2008 | Claassen et al. ................ 702/61 |
| 2009/0292811 | A1 * | 11/2009 | Pienta et al. .................. 709/226 |
| 2009/0327012 | A1 * | 12/2009 | Sharma et al. .................... 705/8 |
| 2010/0057641 | A1 * | 3/2010 | Boss et al. ..................... 705/412 |
| 2011/0107332 | A1 | 5/2011 | Bash |
| 2011/0238340 | A1 | 9/2011 | Dasgupta et al. |
| 2011/0302286 | A1 * | 12/2011 | Parolini et al. ................ 709/223 |
| 2013/0103214 | A1 * | 4/2013 | Das et al. ....................... 700/291 |

OTHER PUBLICATIONS

Bash et al. "Cool Job Allocations: Measuring the Power Savings of Placing Jobs at Cooling-Efficient Locations in the Data Center", USENIX Annual Technical Conference, Jun. 17-22, 2007, Santa Clara, CA, 1-9.*
Moore et al., "Making Scheduling 'Cool': Temperature-Aware Workload Placement in Data Centers," USENIX Association, 2005 USENIX Annual Technical Conference, pp. 61-74.
Moore et al., "Weatherman: Automated, Online, and Predictive Thermal Mapping and Management for Data Centers," Jun. 2006, 9 p.

* cited by examiner

*Primary Examiner* — Emerson Puente
*Assistant Examiner* — Willy W Huaracha
(74) *Attorney, Agent, or Firm* — Conley Rose

(57) ABSTRACT

A data center workload distribution management system includes a cooling cost engine to determine a cooling cost or cooling capacity for each of a plurality of zones of a data center and a workload distribution engine. The workload distribution engine is to identify the zone that has a lowest cooling cost and sufficient cooling capacity and also has sufficient processing capacity for a workload, determine a local cooling efficiency index for at least one location within the identified zone, and distribute the workload to the location having a local cooling efficiency index that indicates the highest cooling efficiency.

15 Claims, 2 Drawing Sheets

SYSTEMS AND METHODS FOR DISTRIBUTING A WORKLOAD BASED ON A LOCAL COOLING EFFICIENCY INDEX DETERMINED FOR AT LEAST ONE LOCATION WITHIN A ZONE IN A DATA CENTER

BACKGROUND

Data centers are complex systems that include power and cooling infrastructure as well as information technology (IT) equipment such as servers, storage, networking switches and the like. IT workloads (e.g., processing tasks) are commonly distributed to achieve a reduction in power consumption of the IT equipment, for example by consolidating workloads so that unused IT equipment may be turned off or put into a lower power state. Alternately, IT workloads are distributed to a particular location in the data center based on knowledge of the location's cooling capacity or the local cooling efficiency. For example, a server that is lower in a rack and thus closer to an air vent or tile may be cooled with less computer room air conditioning (CRAC) power compared to a server that is higher in a rack since the temperatures at the top of the racks can be higher due to recirculation of the hot air from behind the rack.

However, data centers may employ multiple means of cooling generation, each of which has different associated costs, distribution architectures, and eventual impact on the cooling of the data center. Distributing IT workloads based on minimizing IT equipment power consumption or based on local location-dependent cooling efficiency does not address the impact of multiple means of generation on overall system efficiency.

BRIEF DESCRIPTION OF THE DRAWINGS

For a detailed description of various examples, reference will now be made to the accompanying drawings in which.

NOTATION AND NOMENCLATURE

Figure 1:
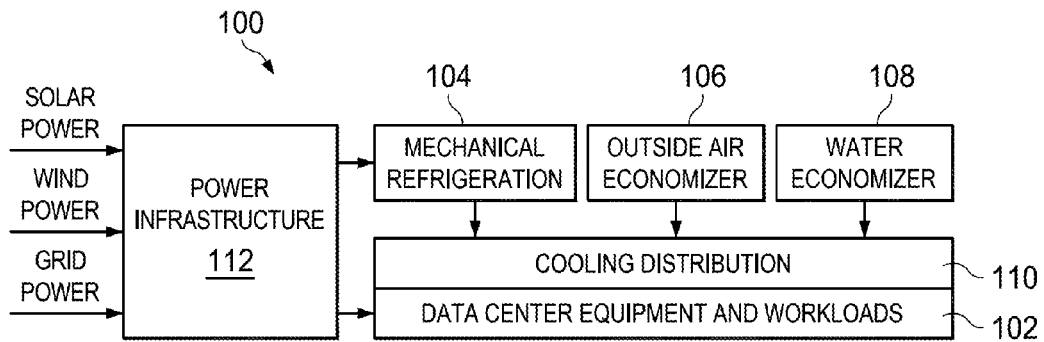
FIG. 1 shows a block diagram of a data center having multiple means of cooling resource generation in accordance with various examples.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these examples may be preferred, the examples disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Data centers may utilize multiple means of cooling resource generation, such as mechanical refrigeration, direct or indirect air-side economizers, direct or indirect water-side economizers, direct expansion (DX) units, chilled water units, or a ground-coupled cooling loop. Each means of cooling resource generation potentially has different costs, distribution efficiencies, and impacts on particular locations of the data center compared to the others. As explained above, current techniques for distributing an IT workload to IT equipment in a data center do not take such factors into account; as a result, IT workloads may be inefficiently distributed (e.g., distributed to a server that satisfies certain conditions for workload distribution, but is more expensive to cool than another available server).

In accordance with various embodiments, a data center is partitioned into multiple zones. The zones may take the form of a simple grid or other organizational scheme of the various IT equipment in the data center (e.g., each row of server racks may be a zone). There may be multiple locations within each zone. The locations may correspond to an individual server, a server rack, or the like. In some cases, one or more environmental parameter sensors are associated with each location to measure environmental parameters of the location, such as temperature or humidity. Alternately, environmental parameters for some locations may be derived by interpolating environmental parameter values from surrounding locations that have an associated sensor.

Each zone has different access to the multiple means of cooling resource generation. For example, in a data center with retrofitted outside air cooling systems, a zone on one end of the data center may have access to both mechanical refrigeration and outside air cooling mechanisms, whereas a zone on the other end of the data center only has access to mechanical refrigeration due to a difficulty in providing outside air cooling to that side of the data center. As a result, the cooling generation cost for each zone differs. Additionally, the cost of each means of cooling resource generation may fluctuate (e.g., when it is warmer outside or the air is more humid, the costs of outside air cooling increase because cooling with warmer air is less efficient and dehumidifying air requires additional power), resulting in dynamic changes to the cooling cost for each zone. In accordance with various embodiments, a zone is identified for IT workload distribution that has both sufficient processing capacity for the workload and the lowest cooling cost based on its access to various means of cooling resource generation. In some cases, a zone may be identified for IT workload distribution that has both sufficient processing capacity for the workload and the lowest overall cost, which may include cooling cost, the cost of computing resources, power cost, and other costs such as labor, building overhead, and the like.

FIG. 1 shows a block diagram of a data center 100 having multiple means of cooling resource generation. The data center 100 includes data center equipment 102, which may include various IT equipment such as servers, storage, networking switches, and the like. The data center equipment 102 is cooled by mechanical refrigeration unit 104, an outside air economizer 106, and a water economizer 108. The various means of cooling are distributed through a cooling distribution interface 110, which may include ductwork, inlet and exhaust vents, and the like. Power is supplied to the data center equipment 102 and the means of cooling resource generation 104, 106, 108 by a power infrastructure 112. The power infrastructure 112 may receive power generated by onsite solar and/or wind generation means or directly from a local power grid.

Figure 2:
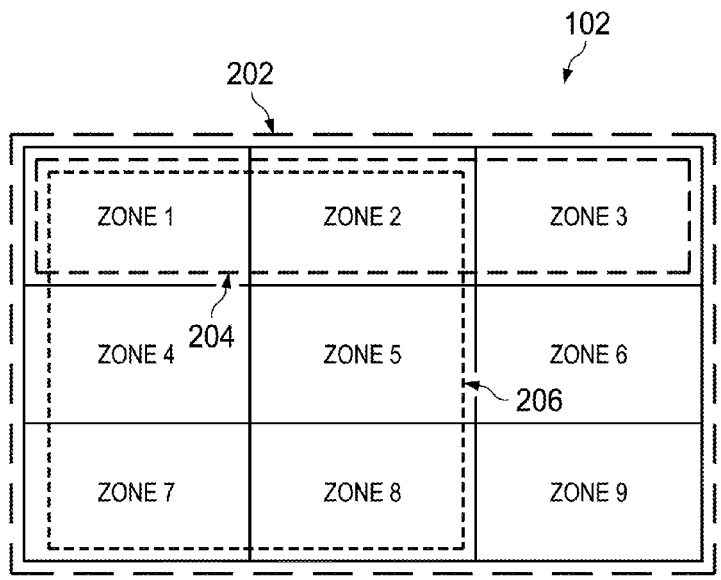
FIG. 2 shows a block diagram of data center equipment divided into zones cooled by multiple means of cooling resource generation in accordance with various examples.

FIG. 2 shows the data center equipment 102 divided into nine zones, numbered 1 through 9. This particular division of zones is an example; the data center equipment 102 could be similarly divided up into many other numbers of zones, zones having different shapes, and the like. As an example of the utilization of multiple means of cooling resource generation, three areas 202, 204, 206 are shown. In this case, the area 202 corresponds to zones 1-9, which are cooled using mechanical refrigeration 104; the area 204 corresponds to zones 1-3, which are cooled using the outside air economizer 106; and the area 206 corresponds to zones 1, 2, 4, 5, 7 and 8, which are cooled using the water economizer 108.

The costs to cool each zone may differ. For example, the distance of a particular zone from a certain type of cooling generation means may result in that zone being more expensive to cool using that particular means, since the impact of the means on the zone is reduced. Additionally, as shown in FIG. 2, not all zones have access to the same cooling generation means, and the actual costs of each of the means may differ. Further, environmental factors may reduce the effectiveness of certain cooling generation means (e.g., outside air economizer 106), which increases the cost of delivering a certain amount of cooling capacity to a zone from that cooling generation means. In addition to the cooling cost, the cooling capacity from the cooling means (i.e., the difference between the maximum cooling capacity and the capacity that is being utilized) may be different as well among the various cooling means, depending on both the operation conditions of the data center and the ambient conditions.

Figure 3:
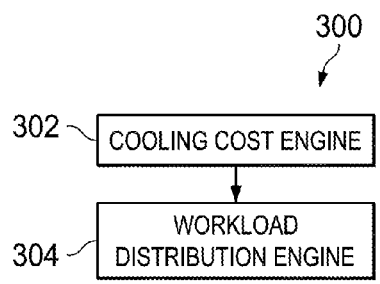
FIG. 3 shows a block diagram of a data center workload distribution management system in accordance with various examples.

Turning now to FIG. 3, a data center workload distribution management system 300 is shown in accordance with various implementations. As shown, the data center workload distribution management system 300 includes a cooling cost engine 302 and a workload distribution engine 304. The cooling cost engine 302 and the workload distribution engine 304 are combinations of programming and hardware to execute the programming. Although shown separately, the cooling cost engine 302 and the workload distribution engine 304 are not required to represent separate pieces of software programming. For example, each engine 302, 304 may share a common processor and memory, although this is not required. Additionally, the programming that enables the functionality of each engine 302, 304 may be included in the same executable file or library.

The cooling resource engine 302 determines a cooling cost and the available cooling capacity for each of the plurality of zones of the data center 102; for example, the nine zones shown in FIG. 2 either qualitatively or quantitatively. The cooling cost engine 302 identifies which of the zones are affected by, or cooled by, which cooling generation means. For example, zone 1 is in areas 202, 204, and 206, which means that it is cooled using a combination of mechanical refrigeration 104, the outside air economizer 106, and the water economizer 108. Similarly, zone 3 is in areas 202 and 204, which means that it is cooled using a combination of mechanical refrigeration 104 and the outside air economizer 106. As another example, zone 9 is solely in area 202, which means that it is cooled using only mechanical refrigeration 104.

As explained above, different cooling generation means may have a different impact factor on a particular zone. For example, the further a zone is from a cooling generation means, the less of an impact that means will have on that zone. Conversely, certain zones may be highly impacted by a cooling generation means due to efficient distribution of that means and close proximity of the zone to that means. The effect of the impact factor of various cooling generation means on the cooling cost for each zone will be explained in further detail below.

The cooling resource engine 302 also determines a cost of each of the cooling generation means. The cost for generating cooling capacity may vary based on the type and cost of power source being utilized by the power infrastructure 112 to provide power for the cooling generation means 104, 106, 108. For example, where on-site solar power is used to power the outside air economizer 106, the cost of cooling generation may be low. As another example, if mechanical refrigeration 104 is used, the power infrastructure 112 may need to provide some or all of the required power from the grid, rendering mechanical refrigeration 104 more costly. For instance, the generation of cooling capacity using mechanical refrigeration 104 may be more costly than generating cooling capacity using the outside air economizer 106. Additionally, the cost of a cooling generation means may include both the cost to generate the cooling capacity as well as the cost to distribute that cooling capacity throughout the data center 100. For example, pumping water through the data center 100 (i.e., distribution cost) may be more costly than pumping air through the data center 100.

The cooling resource engine 302 then calculates the cooling cost and the available cooling capacity of each zone based on, for example, a weighted average of the cost of each of the cooling generation means based on the impact factor of the cooling generation means on a particular zone. Referring back to FIG. 2, for example, the cooling cost of zone 1 is affected by the cost of cooling generation for the mechanical refrigeration unit 104, the outside air economizer 106, and the water economizer 108 as well as the impact factors of each of those cooling generation means on zone 1. Similarly, the cooling cost of zone 3 is affected by the cost of cooling generation for the mechanical refrigeration unit 104 and the outside air economizer 106 as well as the impact factors of each of those cooling generation means on zone 3. As yet another example, the cooling cost of zone 9 is affected solely by the cost of cooling generation for the mechanical refrigeration unit 104 and its impact factor on zone 9.

The cooling resource engine 302 communicates the calculated cooling costs and available capacity for each zone to the workload distribution engine 304, to aid in distribution of an IT workload to the appropriate data center equipment 102. The workload distribution engine 304 identifies the zone that has the lowest calculated cooling cost and has sufficient processing and cooling capacity for the IT workload. In some embodiments, the zone having the lowest calculated cooling cost may be achieved by simply ranking the cooling costs provided by the cooling cost engine 302. In other embodiments, the cooling cost engine 302 provides the cooling costs in a pre-ranked arrangement. Certain zones may not have sufficient processing and/or cooling capacity for the IT workload (e.g., the servers in a zone may be currently running at a high processing load). In other cases, certain servers may be less efficient for a given processing task. Thus, although a zone may have the lowest cooling cost, the IT workload should not be distributed to that zone if it lacks processing capacity for the IT workload.

Once the workload distribution engine 304 identifies the zone that has low cooling cost and has sufficient processing and cooling capacity for the IT workload, the workload distribution engine 304 determines which location (e.g., which server within a rack or which rack of servers within a zone) within the zone the IT workload should be distributed to based on an index to show the relative local cooling efficiency.

For example, the cooling cost and available capacity of each CRAC may be calculated based on their own specification and current operating conditions. A set of thermal correlation indices may be defined to quantify the amount of cooling resources at each server or rack location in the zone from each CRAC unit. The cooling capacity available at the location can then be estimated as the sum of the cooling capacity available from all the CRAC units weighted by the thermal correlation index. Similar sets of indices may also be generated to quantify the amount of the heat load from each server or rack that can be served by each CRAC. The cooling cost at the server or rack location can then be estimated using the index (e.g., as a weighted sum of the CRAC cooling costs).

In some examples, the workload distribution engine 304 identifies the location that possesses the greatest cooling efficiency properties for IT workload distribution. Subsequently, the workload distribution engine 304 distributes the workload to the location that possesses the greatest cooling efficiency properties. In another example, when the cost of the cooling resources that can be delivered to the CRAC units and the cooling capacity of the generation means that are available at the CRAC units can be estimated, the end-to-end cooling cost of each target workload location (e.g., the server or racks) can then be estimated and used to guide the placement of the workload.

Many of the above variables may change in a dynamic manner. For example, the cost and capacity of each cooling generation method depends on external environmental conditions such as ambient air temperature and humidity, and may vary widely along with time of day, season of year, and geographical locations of a data center. Also, a data center is a dynamic thermal environment and the cooling efficiency can vary due to variations in airflow, the amount of workload and the placement of workload with the IT equipment. Thus, in accordance with various embodiments, the cooling cost engine 302 may dynamically update the cooling cost for each zone of the data center 100 and the workload distribution engine 304 may dynamically distribute new IT workloads or redistribute (e.g., move workloads to different IT equipment 102) existing IT workloads based on the updated cooling cost.

Figure 4:
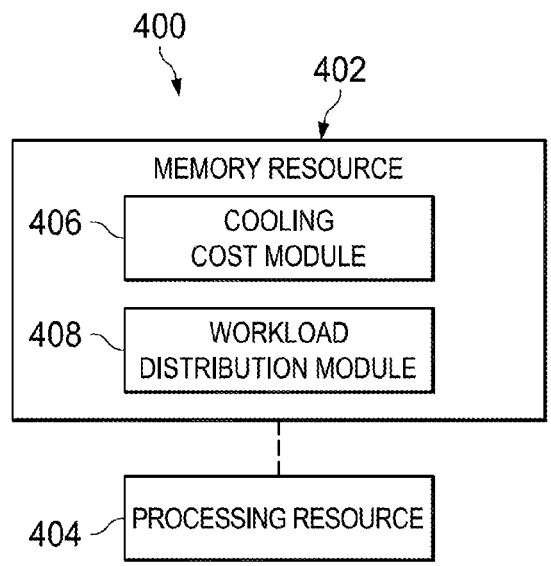
FIG. 4 shows an alternate block diagram of a data center workload distribution management system in accordance with various examples.

FIG. 4 shows another example of a data center workload distribution management system 400 in accordance with various embodiments. The data center workload distribution management system 400 includes a memory resource 402 coupled to a processing resource 404. The processing resource 404 is one or more local or distributed processors. The memory resource 402 includes one or more local or distributed memory devices and comprises a cooling cost module 406 and a workload distribution module 408. Thus, the memory resource 402 and the processing resource 404 are hardware components of the system 400.

Each module 406, 408 represents instructions that, when executed by the processing resource 404, implements an associated engine. For example, when the cooling cost module 406 is executed by the processing resource 404, the above-described cooling cost engine 302 functionality is implemented. Similarly, when the workload distribution module 408 is executed by the processing resource 404, the above-described workload distribution engine 304 functionality is implemented. The modules 406, 408 may also be implemented as an installation package or packages stored on the memory resource 402, which may be a CD/DVD or a server from which the installation package may be downloaded.

Figure 5:
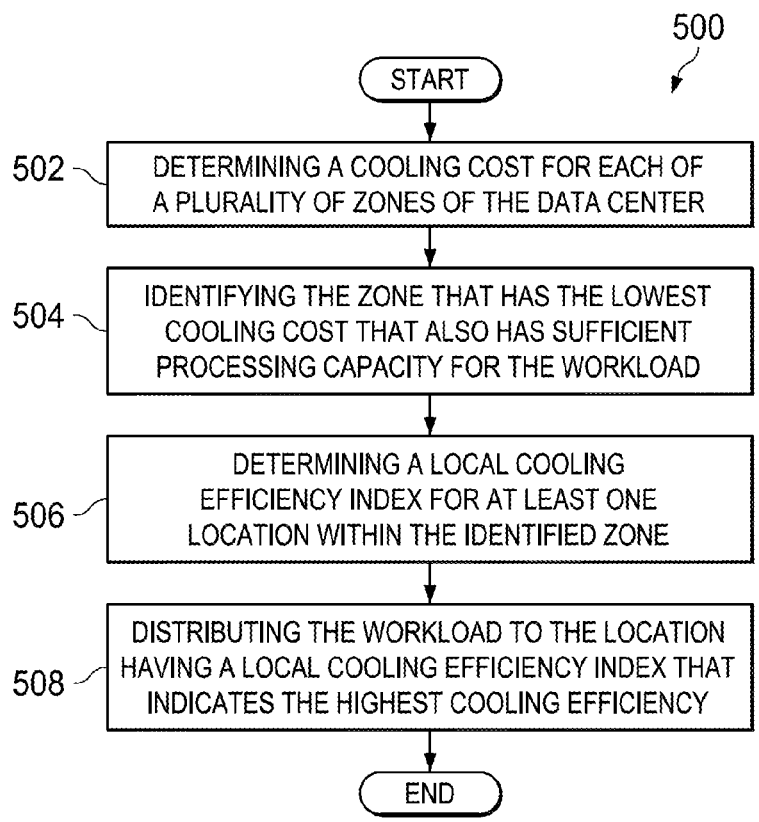
FIG. 5 shows a method flow chart in accordance with various examples.

FIG. 5 shows a method 500 in accordance with various embodiments. The method 500 begins in block 502 with determining a cooling cost for each of a plurality of zones of the data center. As explained above, the cooling cost for a zone is determined based on the cost of generating cooling capacity for each available cooling generation means and the impact factor of each available cooling generations means on a particular zone. The method 500 continues in block 504 with identifying the zone that has the lowest cooling cost that also has sufficient processing capacity for the workload. In some cases, the zone having the lowest cooling cost may not have sufficient processing capacity for a given workload, and thus the IT workload should not be distributed to that zone despite its low cooling cost.

The method 500 continues in block 506 with determining a local cooling efficiency index for at least one location within the identified zone. Finally, the method 500 continues in block 508 with distributing the workload to the location having a local cooling efficiency index that indicates the highest cooling efficiency.

As explained above, many of the above variables may change in a dynamic manner. Thus, in accordance with various embodiments, the method 500 may include dynamically updating the cooling cost for each zone of the data center 100. The method 500 may also include dynamically distributing new IT workloads or redistributing (e.g., moving workloads to different IT equipment 102) existing IT workloads based on the updated cooling cost.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A data center workload distribution management system, comprising:
   a processor; and
   a memory storing instructions which when executed by the processor implement;
   a cooling cost engine to determine a cooling cost or cooling capacity for each of a plurality of zones of a data center, wherein the cooling cost engine;
      determines, for each of a plurality of cooling generation means, the zones affected by the cooling generation means and an impact factor of the cooling generation means on each zone;
      determines a cost of each of the plurality of cooling generation means; and
      calculates the cooling cost of each zone based on a weighted average of the cost of each of the cooling generation means and the impact factor of the cooling generation means on a particular zone; and a workload distribution engine to:
- identify the zone that has a lowest cooling cost and sufficient cooling capacity and also has sufficient processing capacity for a workload;
- determine a local cooling efficiency index for at least one location within the identified zone; and
- distribute the workload to the location having a local cooling efficiency index that indicates the highest, cooling efficiency.

2. The data center workload distribution management system of claim 1 wherein the cost of each of the cooling generation means includes a generation cost and a distribution cost.

3. The data center workload distribution management system of claim 1 wherein the cooling cost engine dynamically updates the cooling cost for each zone of the data center.

4. The data center workload distribution management system of claim 3 wherein the workload distribution engine dynamically distributes new workloads based on the updated cooling cost.

5. The data center workload distribution management system of claim 3 wherein the workload distribution engine dynamically redistributes existing workloads based on the updated cooling cost.

6. A method for distributing a workload in a data center, comprising:
- determining a cooling cost or cooling capacity for each of a plurality of zones of the data center wherein determining a cooling cost further comprises;
  - determining, for each of a plurality of cooling generation means, the zones affected by the cooling generation means and an impact factor of the cooling generation means on each zone;
  - determining a cost of each of the plurality of cooling generation means; and
  - calculating the cooling cost of each zone based on a weighted average e of the cost of each of the cooling generation means and the impact factor of the cooling generation means on a particular zone;
- identifying the zone that has the lowest cooling cost and sufficient cooling capacity and also has sufficient processing capacity for the workload;
- determining a local cooling efficiency index for at least one location within the identified zone; and
- distributing the workload to the location having a local cooling efficiency index that indicates the highest cooling efficiency.

7. The method of claim 6 wherein the cost of each of the cooling generation means includes a generation cost and a distribution cost.

8. The method of claim 6 further comprising dynamically updating the cooling cost for each zone of the data center.

9. The method of claim 8 further comprising dynamically distributing new workloads based on the updated cooling cost.

10. The method of claim 8 further comprising dynamically redistributing existing workloads based on the updated cooling cost.

11. A non-transitory, computer-readable storage device storing software that, when executed by a processor, causes the processor to:
- determine a cooling cost or cooling capacity for each of a plurality of zones of a data center, wherein when the processor determines the cooling cost, the processor further;
  - determines, for each of a plurality of cooling generation means, the zones affected by the cooling generation means and an impact factor of the cooling generation means on each zone;
  - determines a cost of each of the plurality of cooling generation means; and
  - calculates the cooling cost of each zone based on a weighted average of the cost of each of the cooling generation means and the impact factor of the cooling generation means on a particular zone;
- identify the zone that has the lowest cooling cost and sufficient coding capacity and also has sufficient processing capacity for a workload;
- determine a local cooling efficiency index for at least one location within the identified zone; and
- distribute the workload to the location having a local cooling efficiency index that indicates the highest cooling efficiency.

12. The non-transitory, computer-readable storage device of claim 11 wherein the cost of each of the cooling generation means includes a generation cost and a distribution cost.

13. The non-transitory, computer-readable storage device of claim 11 wherein the processor dynamically updates the cooling cost for each zone of the data center.

14. The non-transitory, computer-readable storage device of claim 13 wherein the processor dynamically distributes new workloads based on the updated cooling cost.

15. The non-transitory, computer-readable storage device of claim 13 wherein the processor dynamically redistributes existing workloads based on the updated cooling cost.

* * * * *